(12) United States Patent
Vijayan

(10) Patent No.: US 12,114,626 B2
(45) Date of Patent: Oct. 15, 2024

(54) INDOOR GARDEN CENTER ENVIRONMENTAL CONTROL SYSTEM

(71) Applicant: Haier US Appliance Solutions, Inc., Wilmington, DE (US)

(72) Inventor: Vineeth Vijayan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 351 days.

(21) Appl. No.: 17/470,526

(22) Filed: Sep. 9, 2021

(65) Prior Publication Data

US 2023/0076358 A1     Mar. 9, 2023

(51) Int. Cl.
*A01G 9/24*     (2006.01)
*F25D 11/00*     (2006.01)

(52) U.S. Cl.
CPC .............. *A01G 9/246* (2013.01); *F25D 11/00* (2013.01)

(58) Field of Classification Search
CPC ................................ A01G 9/246; F25D 11/00
See application file for complete search history.

(56) References Cited

U.S. PATENT DOCUMENTS

| | | | |
|---|---|---|---|
| 5,220,807 A | 6/1993 | Bourne | |
| 6,105,380 A * | 8/2000 | Yokomachi | F25B 49/022 62/217 |
| 6,705,043 B1 * | 3/2004 | Opdam | A01G 9/243 165/45 |
| 9,228,762 B2 | 1/2016 | Wu | |
| 2004/0168456 A1 * | 9/2004 | Chiang | F28F 1/32 165/182 |
| 2015/0300714 A1 * | 10/2015 | Ishimura | F25B 49/02 62/228.1 |
| 2019/0154321 A1 * | 5/2019 | Takenaka | F25B 47/025 |
| 2021/0204489 A1 * | 7/2021 | Choi | A01G 7/045 |

FOREIGN PATENT DOCUMENTS

| | | |
|---|---|---|
| CN | 202203602 U | 4/2012 |
| CN | 203453058 U | 2/2014 |
| CN | 109511543 A | 3/2019 |
| CN | 109668218 A | 4/2019 |
| EP | 2504655 B1 | 2/2019 |

* cited by examiner

*Primary Examiner* — Jonathan Bradford
(74) *Attorney, Agent, or Firm* — Dority & Manning, P.A.

(57) ABSTRACT

An indoor gardening appliance includes a cabinet defining a grow chamber within the cabinet. The gardening appliance further includes environmental control system configured to adjust atmospheric conditions in the grow chamber. The gardening appliance may be operable to activate a compressor of the environmental control system to circulate a refrigerant through a sealed system of the environmental control system. The refrigerant enters the compressor at a suction side of the compressor and the refrigerant entering the compressor has a pressure that corresponds to a saturation temperature below the freezing point of water. The gardening appliance may be further operable to flow air across a heat exchange surface of the sealed system. The heat exchange surface of the sealed system is upstream of the grow chamber with respect to the air flow direction, and the heat exchange surface has a temperature above the freezing point of water.

2 Claims, 14 Drawing Sheets

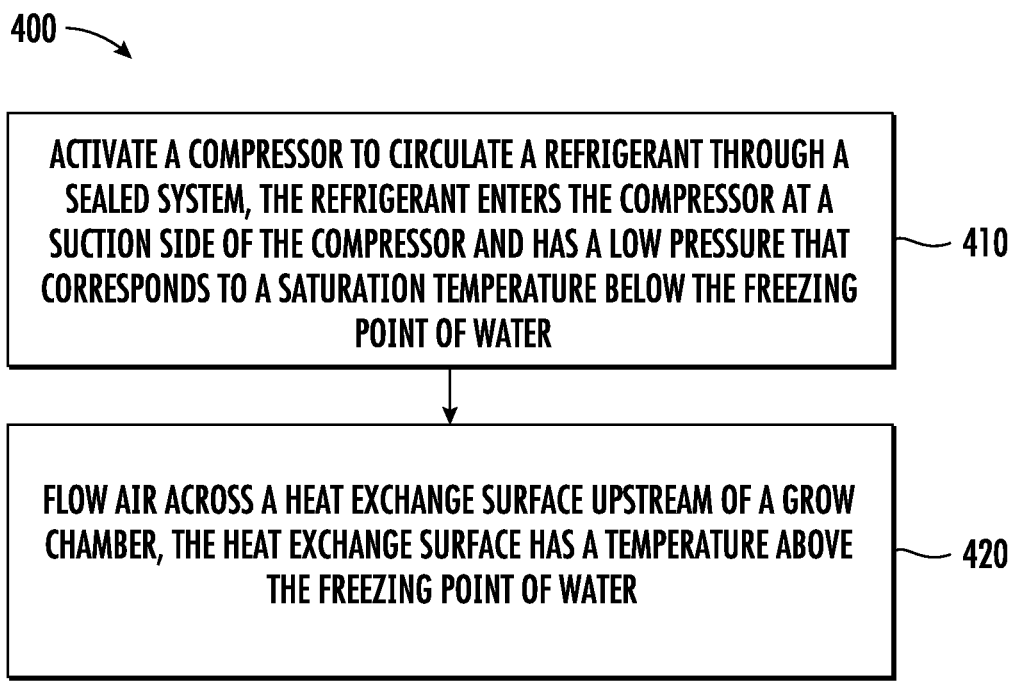

INDOOR GARDEN CENTER ENVIRONMENTAL CONTROL SYSTEM

FIELD OF THE INVENTION

The present subject matter relates generally to systems for gardening plants indoors, and more particularly, to a system and method for regulating the internal environment in a garden center.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature and humidity. Certain indoor garden centers may also include hydration systems for watering the plants and/or artificial lighting systems that provide the light necessary for such plants to grow.

Conventional environmental control systems for garden centers provide a high humidity environment within the garden center which is desirable for growing plants. In order to provide the desired humidity level, the evaporator of such environmental control systems typically operates at a higher temperature and the compressor of such environmental control systems typically operates with a higher back pressure. Operating the compressor with a high back pressure results in a higher mass flow rate through the compressor, which also causes the compressor to do more work and create more noise.

Accordingly, an improved indoor garden center would be useful. More particularly, an indoor garden center with an environmental control system that provides desirable high humidity without increased workload or noise generation of the compressor would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a method of operating a gardening appliance is provided. The gardening appliance includes a cabinet defining a grow chamber within the cabinet and an environmental control system configured to adjust atmospheric conditions in the grow chamber. The method includes activating a compressor of the environmental control system to circulate a refrigerant through a sealed system of the environmental control system. The refrigerant enters the compressor at a suction side of the compressor and the refrigerant entering the compressor has a low pressure such that the corresponding saturation temperature is below the freezing point of water. The method also includes flowing air across a heat exchange surface of the sealed system. The heat exchange surface of the sealed system is upstream of the grow chamber with respect to the air flow direction. The heat exchange surface has a temperature above the freezing point of water.

In another exemplary embodiment, a gardening appliance is provided. The gardening appliance includes a cabinet defining a grow chamber within the cabinet and environmental control system configured to adjust atmospheric conditions in the grow chamber. The gardening appliance further includes a controller. The controller of the gardening appliance is configured for activating a compressor of the environmental control system to circulate a refrigerant through a sealed system of the environmental control system. The refrigerant enters the compressor at a suction side of the compressor and the refrigerant entering the compressor has a low pressure such that the corresponding saturation temperature is below the freezing point of water. The controller of the gardening appliance is also configured for flowing air across a heat exchange surface of the sealed system. The heat exchange surface of the sealed system is upstream of the grow chamber with respect to the air flow direction. The heat exchange surface has a temperature above the freezing point of water.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 14 provides a flow chart of an exemplary method of operating a gardening appliance according to one or more exemplary embodiments of the present subject matter.

Figure 1:
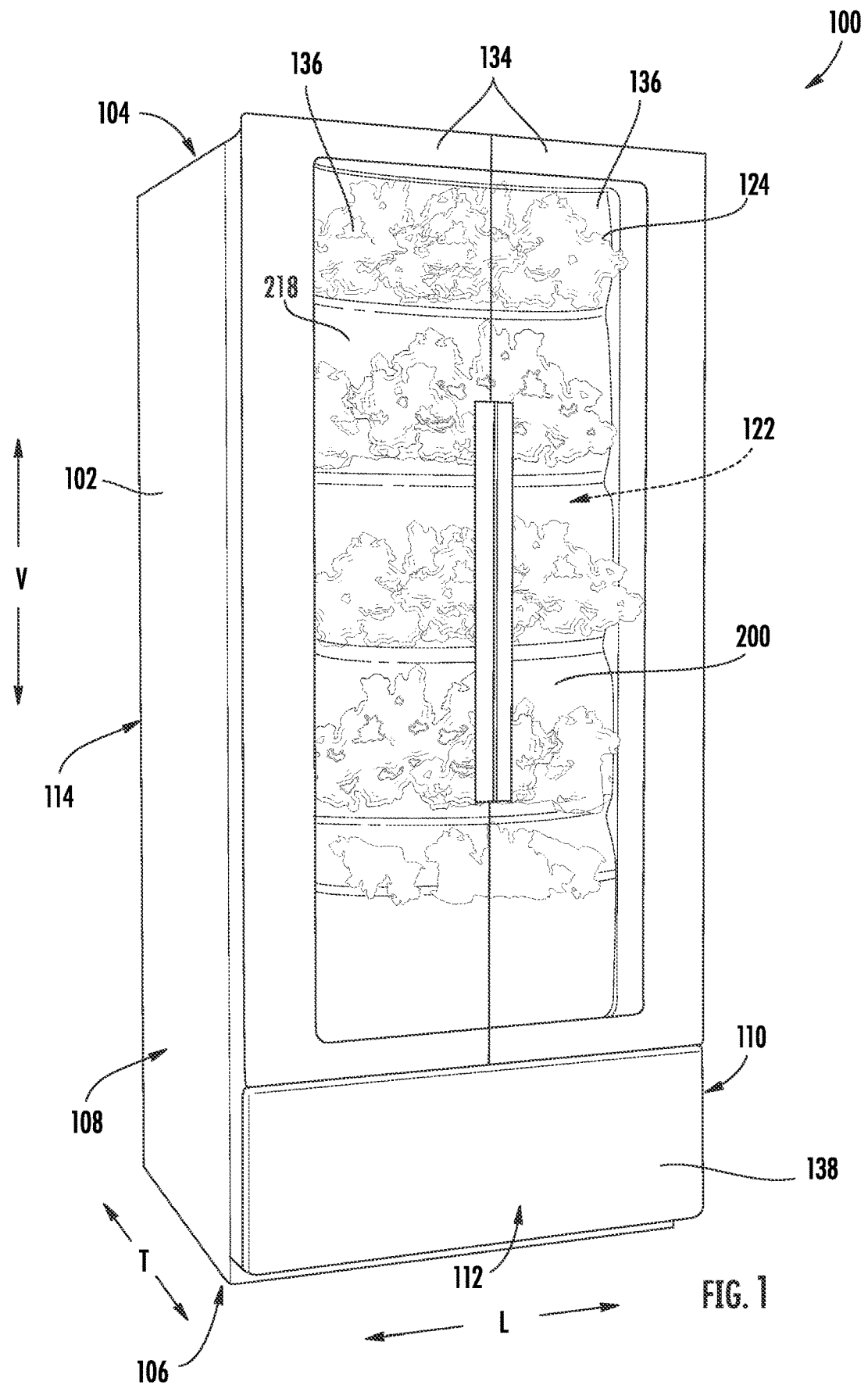
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
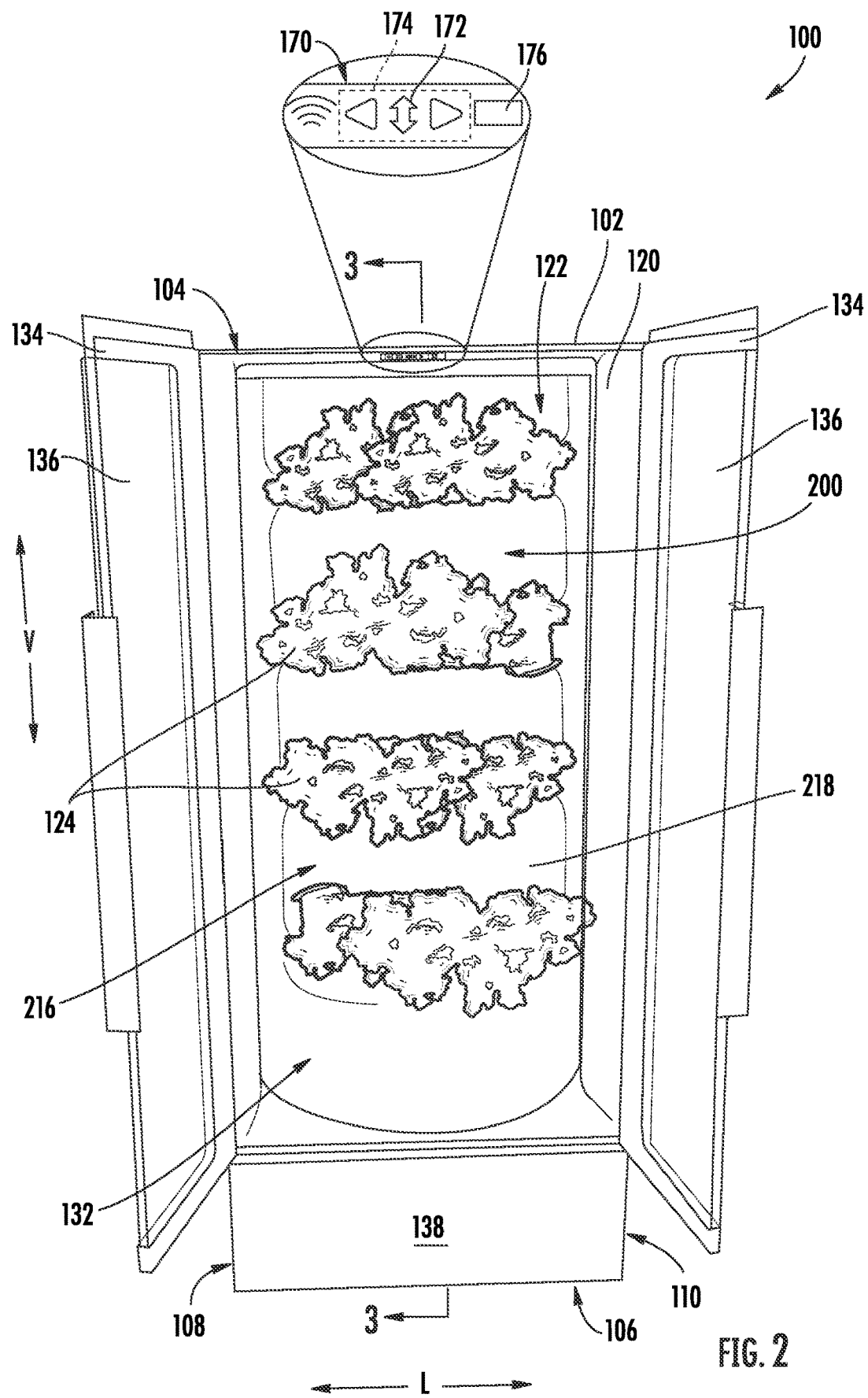
FIG. 2 depicts a front view of the exemplary gardening appliance of FIG. 1 with the doors open according to an exemplary embodiment of the present subject matter.
Figure 3:
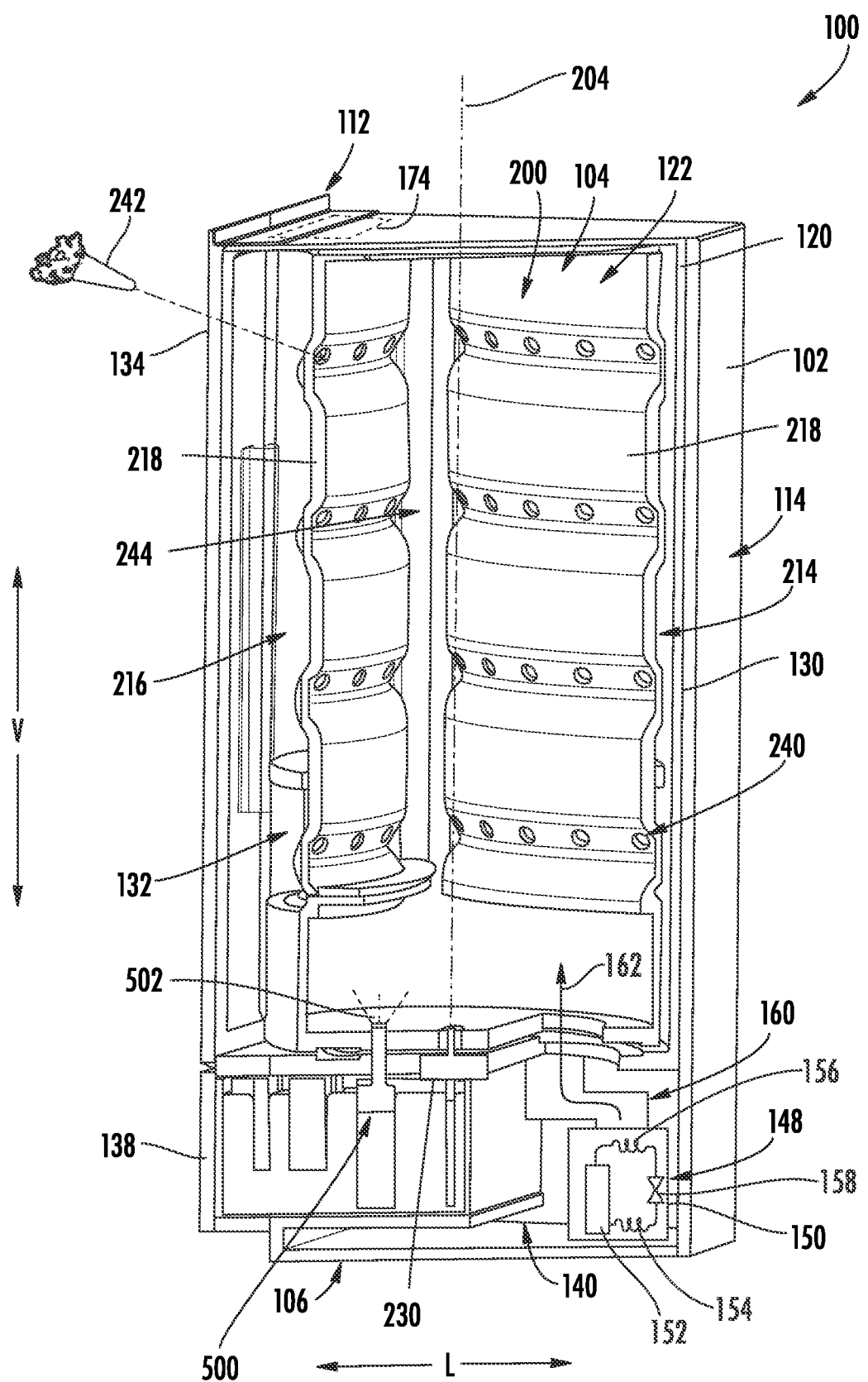
FIG. 3 is a cross sectional view of the exemplary gardening appliance of FIG. 1, taken along Line 3-3 from FIG. 2 with an internal divider removed for clarity.

FIG. 1 provides a front view of a gardening appliance 100 according to an exemplary embodiment of the present subject matter. FIG. 2 depicts a front view of the exemplary gardening appliance of FIG. 1 with the doors open. FIG. 3 is a cross sectional view of the exemplary gardening appliance of FIG. 1, taken along Line 3-3 from FIG. 2 with an internal divider removed for clarity. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Referring now generally to FIGS. 1 through 3, gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled chamber, referred to herein generally as a grow chamber 122, within which plants 124 may be grown. For example, the grow chamber 122 may include a front portion and one or more back portions, as will be described in more detail below, and the liner 120 may at least partially define the one or more back portions of the grow chamber 122. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130 (FIG. 3). In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open position for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

FIG. 3 provides a schematic view of certain components of an environmental control system 148 that may be used to regulate a temperature within grow chamber 122. Specifically, environmental control system 148 may include a sealed system 150, a duct system 160, and a hydration system 500 which provides a spray or mist 502 of water, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of portions of the grow chamber, referred to herein generally by reference numeral 210, by dividing or partitioning grow chamber 122 into the separate portions. Referring specifically to a first embodiment of grow module 200 illustrated in FIGS. 1 through 8, grow module 200 includes three faces, and each face of the grow module 200 is positioned within one of the portions 210 of the grow chamber 122. In additional embodiments, the grow module 200 may include, e.g., two faces or more than three faces, such as four faces, five faces, six faces, or more. In particular, the illustrated exemplary grow module 200 includes a first face 212 in a back right portion 210 of the grow chamber 122, a second face 214 in a back left portion 210 of the grow chamber 122, and a third face 216 in a front portion 210 of the grow chamber 122. In general, as grow module 200 is rotated within grow chamber 122, the plurality of portions 210 of the grow chamber 122 define substantially separate and distinct growing environments, e.g., for growing plants 124 having different growth needs, and the faces 212, 214, and 216 of the grow module 200 may travel successively through the distinct environments of the different portions 210 of the grow chamber 122.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition are joined with an adjacent partition using an arcuate wall 218, where each arcuate wall 218 extends across one face 212, 214, or 216 of the grow module 200 and is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various portions 210 of chamber 122 for measuring temperatures and/or humidity, respectively. Controller 174 may then operate motor 230 in order to maintain desired environmental conditions for plants 124 on each face 212, 214, and 216 of the grow module 200. For example, as will be described in more detail below, gardening appliance 100 includes features for providing certain locations of gardening appliance 100 with light, temperature control, proper moisture, nutrients, and other requirements for suitable plant growth. Motor 230 may be used to position a specific one of the faces 212, 214, and 216 where needed to receive such growth requirements, and/or may be used to rotate each face, e.g., all three faces in the illustrated exemplary embodiments, through the various portions 210 of the grow chamber 122.

According to an exemplary embodiment, such as where the grow module 200 includes three partitions 206 and three faces 212, 214, and 216, controller 174 may operate motor 230 to index grow module 200 sequentially through a number of preselected positions. More specifically, motor 230 may rotate grow module 200 in a counterclockwise direction (e.g. when viewed from a top of grow module 200, as in FIG. 4, for example) in 120° increments to move the faces 212, 214, and 216 between sealed positions and display positions. As used herein, a face 212, 214, or 216 is considered to be in a "sealed position" when that face 212, 214, or 216 is substantially sealed between grow module 200 (i.e., central hub 202 and adjacent partitions 206) and liner 120. By contrast, a face 212, 214, or 216 is considered to be in a "display position" when that face 212, 214, or 216 is at least partially exposed to front display opening 132, such that a user may access plants 124 positioned on that face 212, 214, or 216.

Figure 4:
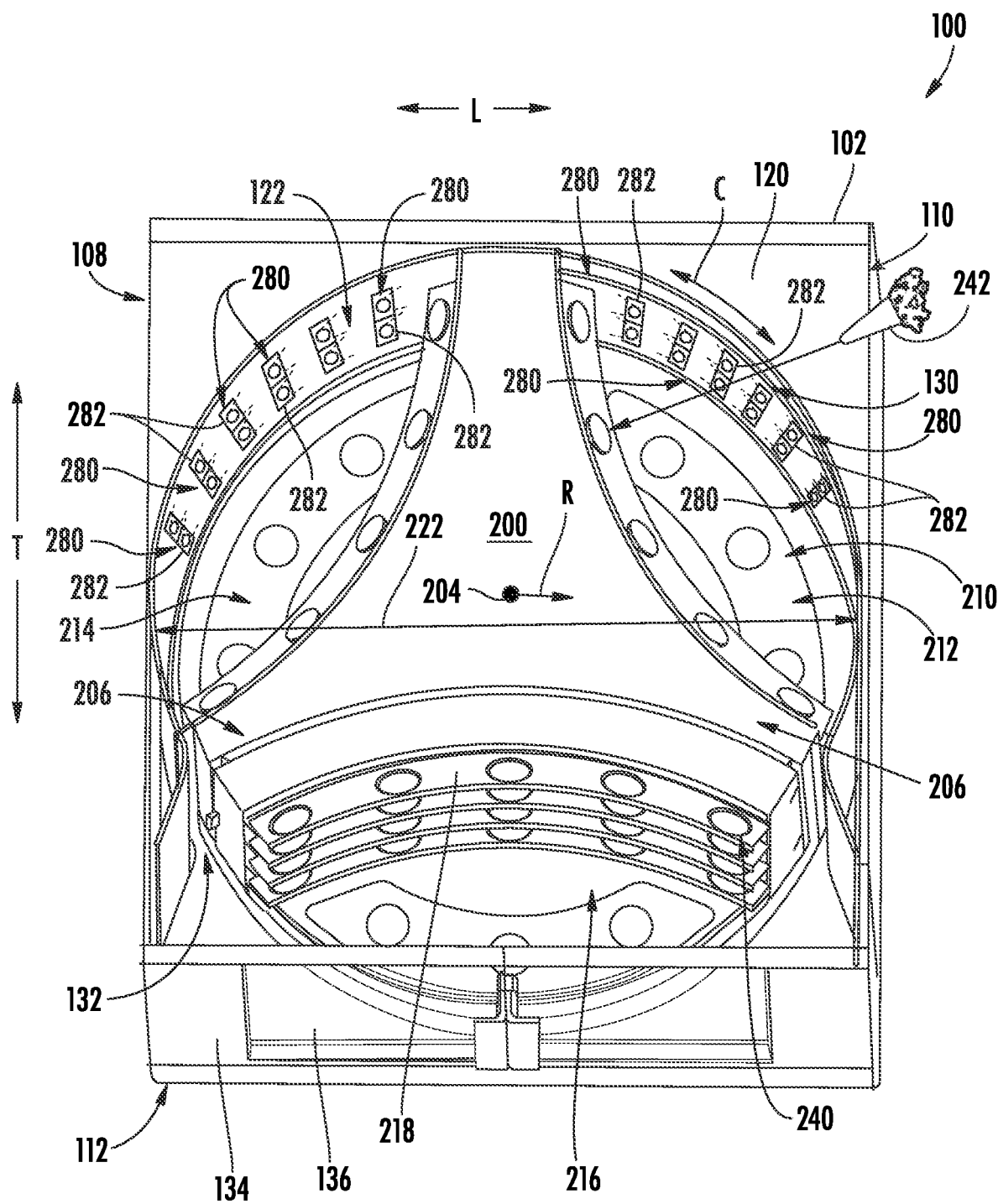
FIG. 4 is a top perspective view of the exemplary gardening appliance of FIG. 1, with the top panel of the cabinet removed to reveal a rotatable grow module according to an exemplary embodiment of the present subject matter.
Figure 5:
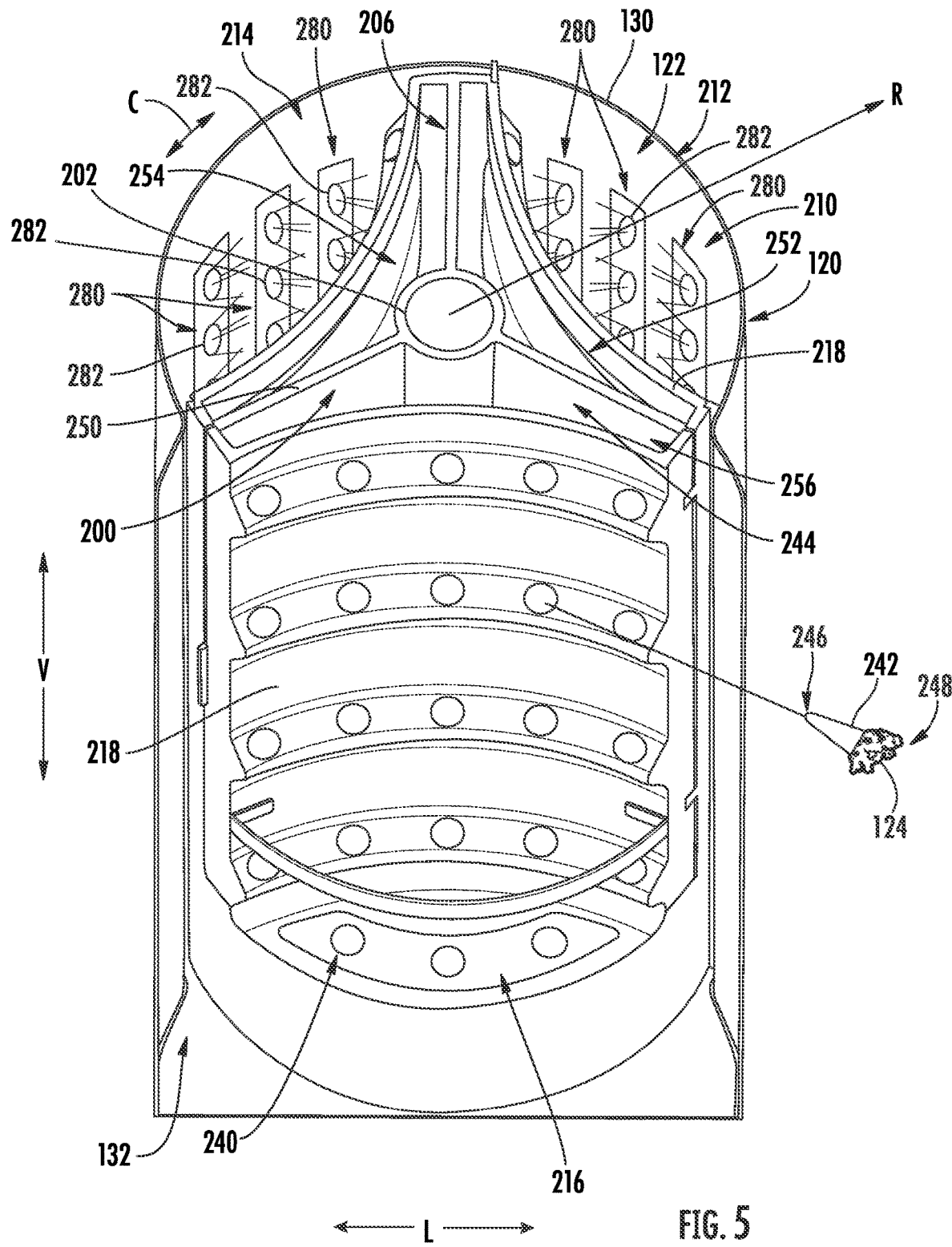
FIG. 5 provides a perspective cross sectional view of the exemplary gardening appliance of FIG. 1 according to another exemplary embodiment of the present subject matter.
Figure 6:
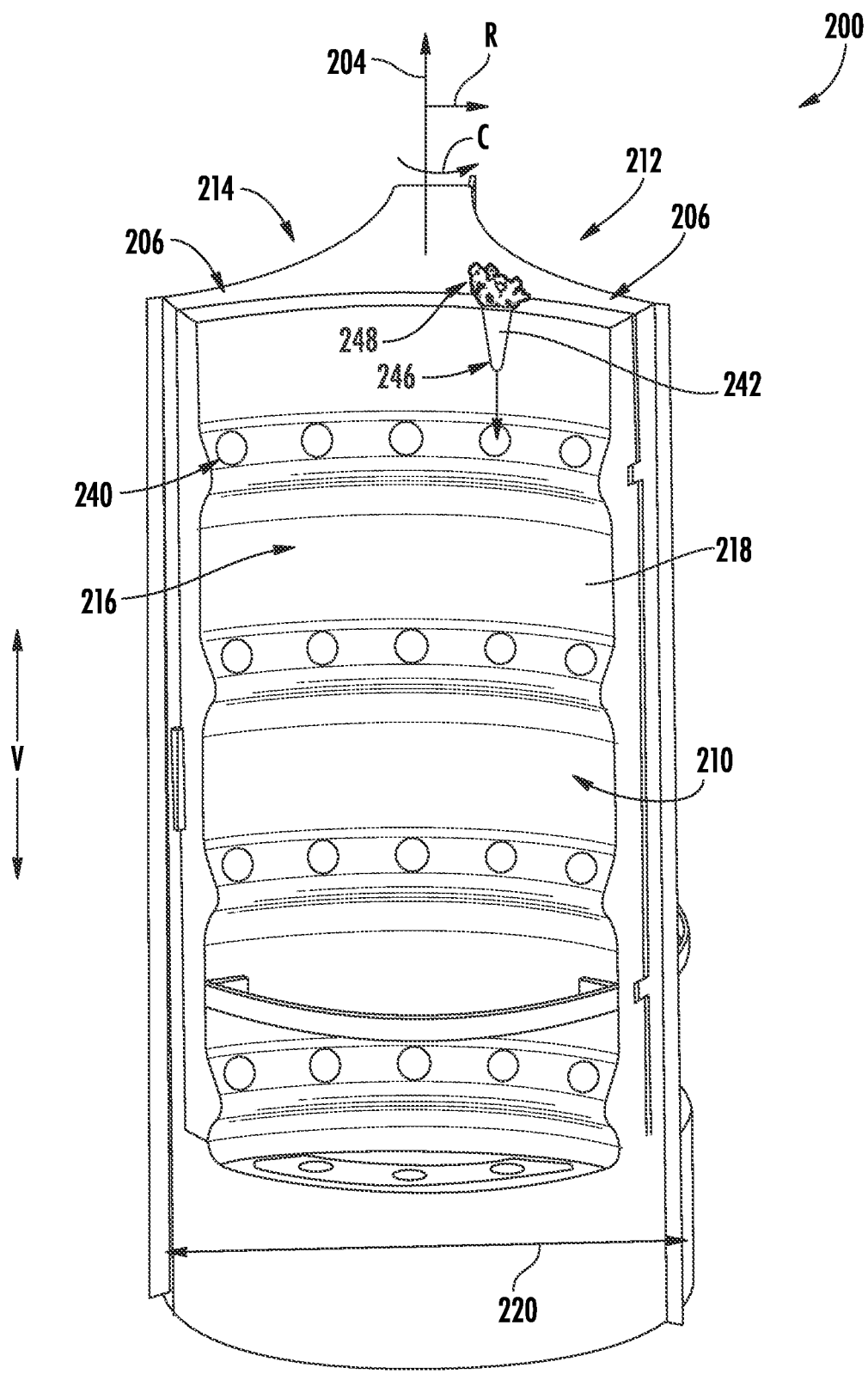
FIG. 6 provides a perspective view of the grow module of the exemplary gardening appliance of FIG. 1 according to another exemplary embodiment of the present subject matter.

For example, as illustrated in FIGS. 4 and 5, first face 212 and second face 214 are both in a sealed position, whereas third face 216 is in a display position. As motor 230 rotates grow module 200 by 120 degrees in the counterclockwise direction, second face 214 will enter the display position, while first face 212 and third face 216 will be in the sealed positions. Motor 230 may continue to rotate grow module 200 in such increments to cycle faces 212, 214, and 216 between these sealed and display positions.

Referring now generally to FIGS. 4 through 8, grow module 200 will be described in more detail according to an exemplary embodiment of the present subject matter. As shown, grow module 200 defines a plurality of pod apertures 240 defined in each face 212, 214, and 216 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of pod apertures 240 into root chamber 244. A plant end 248 of the plant pod 242 may remain outboard of the respective face 212, 214, or 216 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, pod apertures 240 may be covered by a flat flapper seal (not shown) to prevent water from escaping root chamber 244 when no plant pod 242 is installed.

Figure 7:
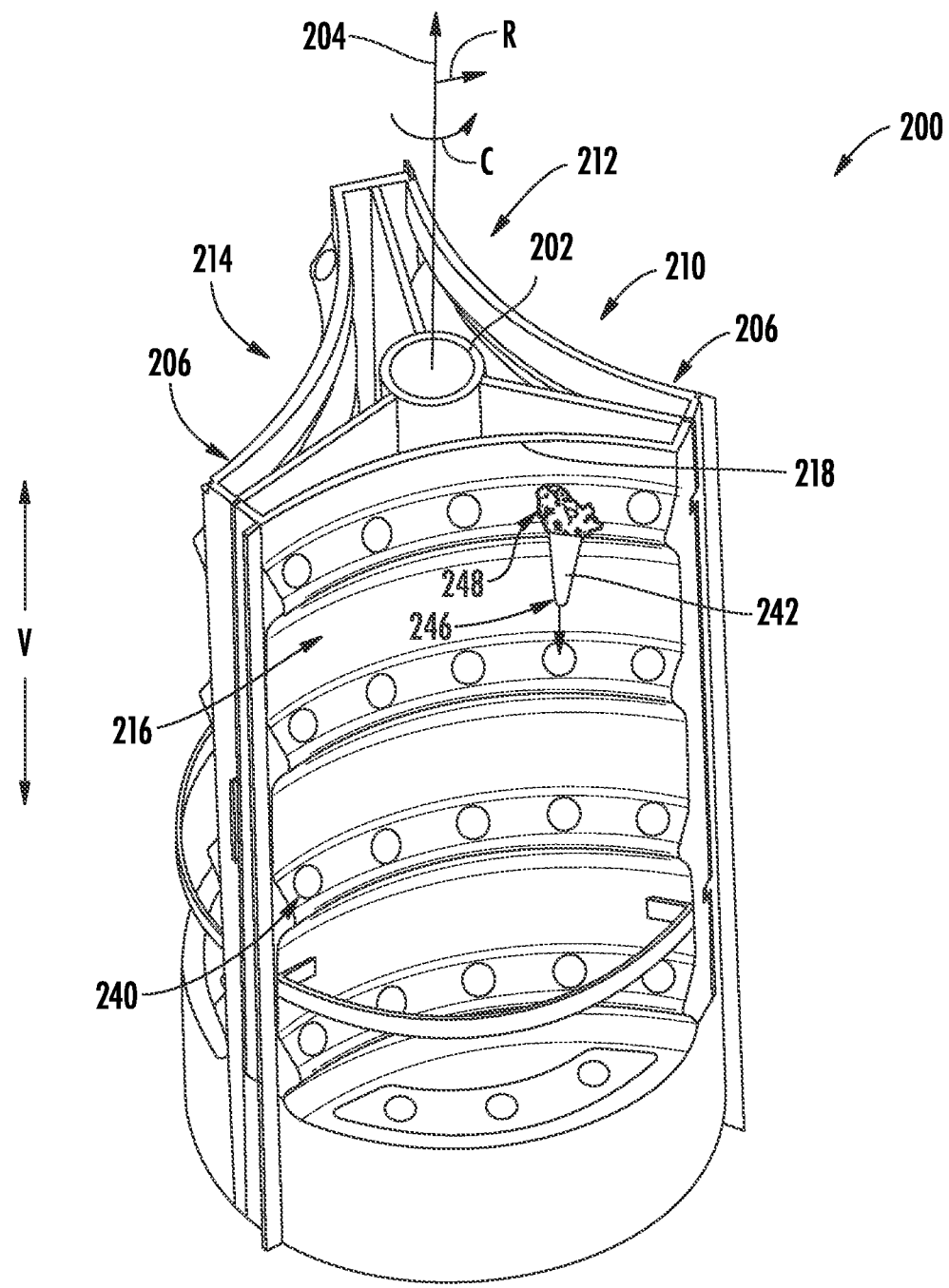
FIG. 7 provides a perspective view of the exemplary grow module of FIG. 6 according to another exemplary embodiment of the present subject matter.
Figure 8:
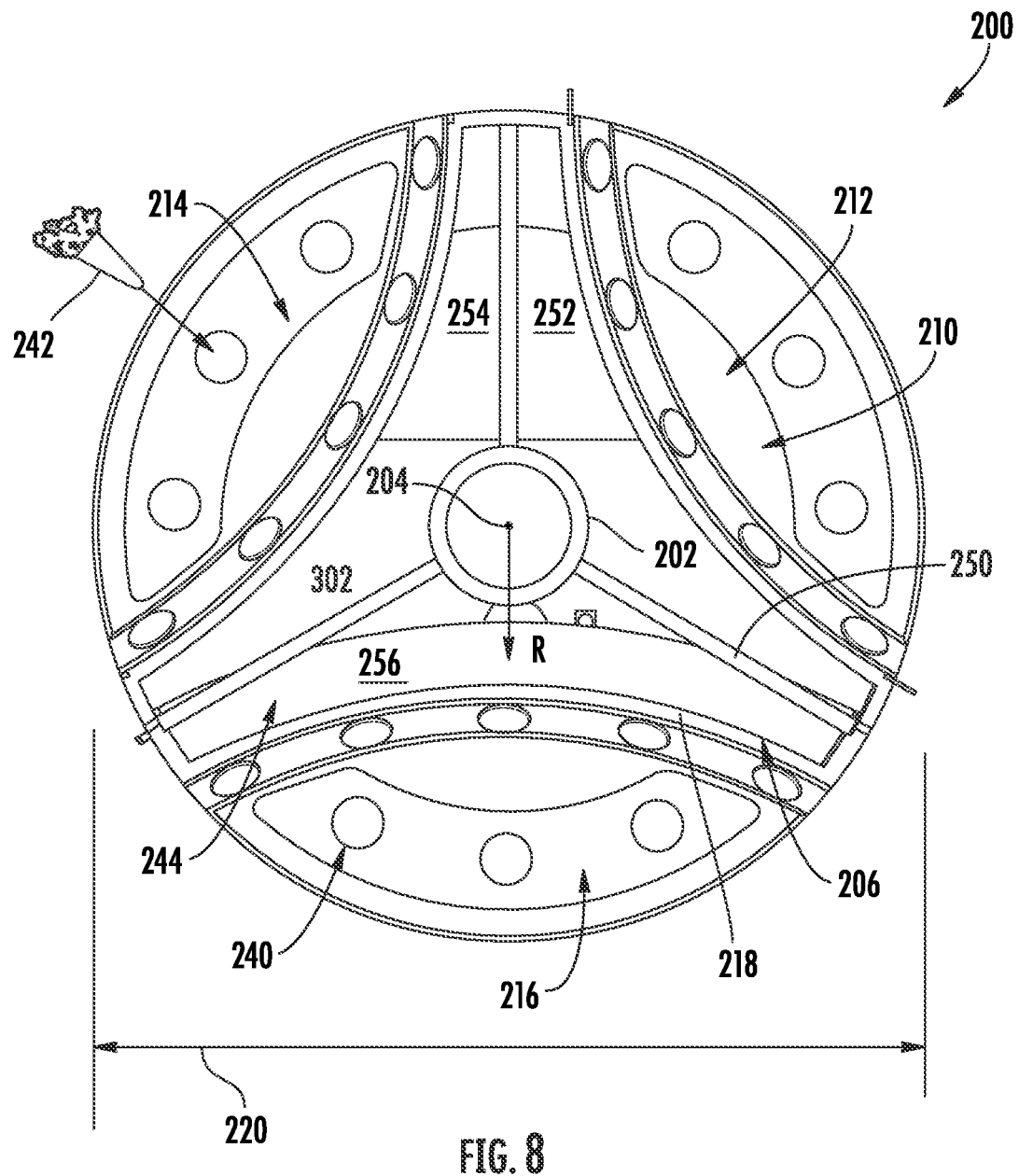
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of portions 210 of grow chamber 122 through the plurality of pod apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in an aperture of the first face 212, second root chamber 254 may provide water and nutrients to plants 124 positioned in an aperture of the second face 214, and third root chamber 256 may provide water and nutrients to plants 124 positioned in an aperture of the third face 216. In this manner, environmental control system 148 may control the temperature and/or humidity of each of the plurality of root chambers 252-256 independently of each other.

Notably, environmental control system 148 described above is generally configured for regulating the temperature and humidity (e.g., or some other suitable water level quantity or measurement) within one or all of the portions 210 of the grow chamber 122 and/or root chambers 252-256 independently of each other. In this manner, a versatile and desirable growing environment may be obtained for each and every portion 210 of the growing chamber 122.

Referring now for example to FIGS. 4 and 5, gardening appliance 100 may further include an artificial lighting system including a plurality of light assemblies 280 which is generally configured for providing light into the one or more back portions 210 of the growth chamber 122 to facilitate photosynthesis and growth of plants 124. For example, each light assembly 280 may be in optical communication with one of the one or more back portions 210 of the grow chamber 122, such as in direct optical communication as in the illustrated example embodiments. As shown, each light assembly 280 may include a plurality of light sources 282 stacked in an array, e.g., extending along the vertical direction V. For example, light sources 282 may be mounted directly to liner 120 within grow chamber 122 for direct optical communication with the or each back portion 210 of the grow chamber. In additional embodiments, the light sources 282 may alternatively be positioned behind liner 120 such that light is projected through a transparent window or light pipe into grow chamber 122, whereby the light sources 282 are in indirect optical communication with the one or more back portions 210. The position, configuration, and type of light sources 282 described herein are not intended to limit the scope of the present subject matter in any manner unless set forth in the claims.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. Additionally, light sources 282 in at least one of the back portions 210 of the grow chamber 122 may include light sources 282 that are configured to emit full-spectrum light or ultraviolet light, such as one or both of type-A ultraviolet (UVA) light and type-B ultraviolet (UVB) light. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

Light generated from light assembly 280 may result in light pollution within a room where gardening appliance 100 is located. Therefore, the gardening appliance 100 may include features for reducing light pollution, or to the blocking of light from light sources 282 through front display opening 132. Specifically, as illustrated, the light assemblies 280 are positioned only within the enclosed back portion 130 of liner 120 such that only faces 212, 214, and 216 of the grow module 200 which are in a sealed position are exposed to light from light sources 282. Specifically, grow module 200 acts as a physical partition between light assemblies 280 and front display opening 132. In this manner, as illustrated in FIG. 5, no light may pass from the back portion 130 of the grow chamber 122 through grow module 200 and out front display opening 132. As grow module 200 rotates, two of the three faces 212, 214, and 216 of the grow module 200 (and plants 124 positioned in the pod apertures 240 thereof) will receive light from light assembly 280 at a time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first face and a second face. According to such an embodiment, by rotating grow module 200 by 180 degrees about central axis 204, the first face may alternate between the sealed position (e.g., facing rear side 114 of cabinet 102) and the display position (e.g., facing front side 112 of cabinet 102). By contrast, the same rotation will move the second face from the display position to the sealed position.

Referring now generally to FIGS. 9 through 13, in some embodiments the environmental control system may include a low back pressure compressor in a high back pressure system. For example, the high back pressure system may provide a relatively high, e.g., above the freezing temperature of water (approximately 0° C. or 32° F.), temperature at a heat exchange surface 300 which interacts with the flow of air 162 into the grow chamber 122 while the compressor 152 is operating with a low back pressure, e.g., where refrigerant enters the compressor 152, such as at a suction side 151 thereof, at a relatively low pressure such that the corresponding saturation temperature is low, e.g., at a saturation temperature below the freezing temperature of water, such as less than about 32° F., such as less than about 20° F., such as less than about 10° F., such as about 0° F. Those of ordinary skill in the art will recognize that such systems, e.g., high back pressure systems with a low back pressure compressor, make the evaporator 154 less efficient. Embodiments of the present subject matter may be advantageous, nevertheless, in that the level or amount of noise, e.g., the volume of noise, such as in dB, generated by the compressor 152 during operation thereof may be reduced.

Figure 9:
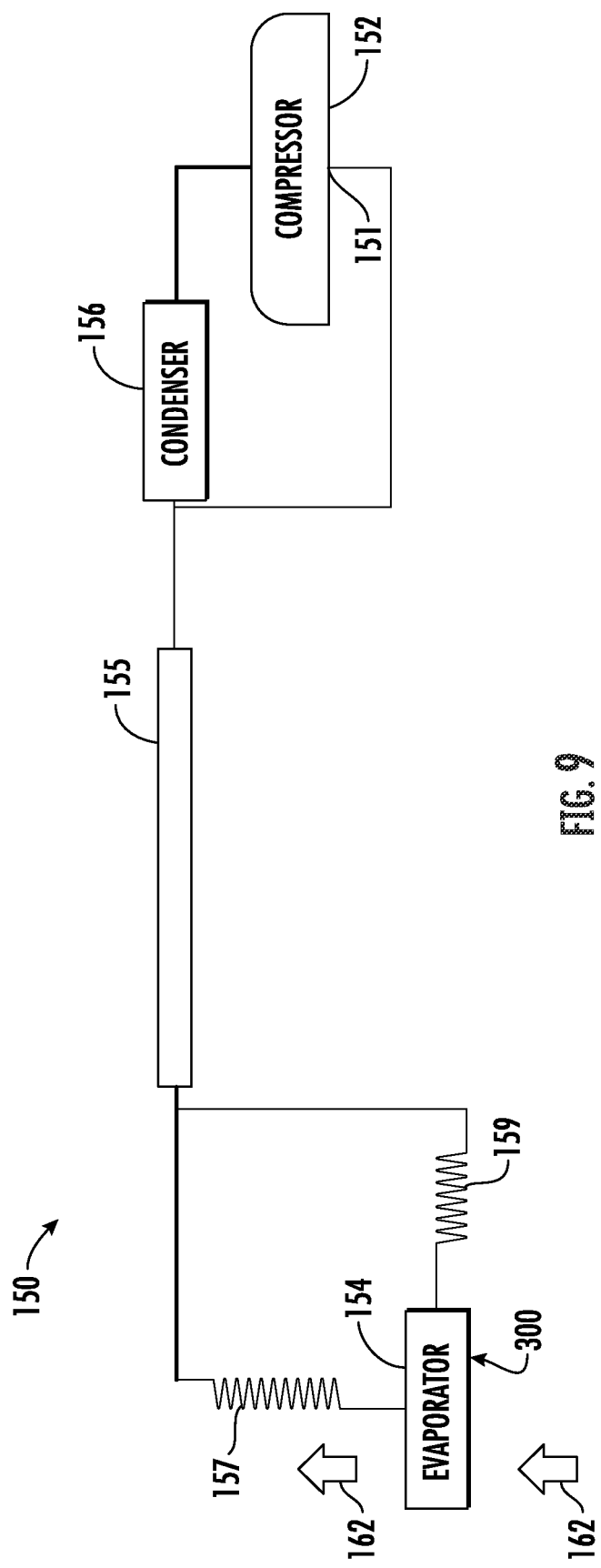
FIG. 9 provides a schematic view of an environmental control system for a gardening appliance according to one or more exemplary embodiments of the present subject matter.
Figure 10:
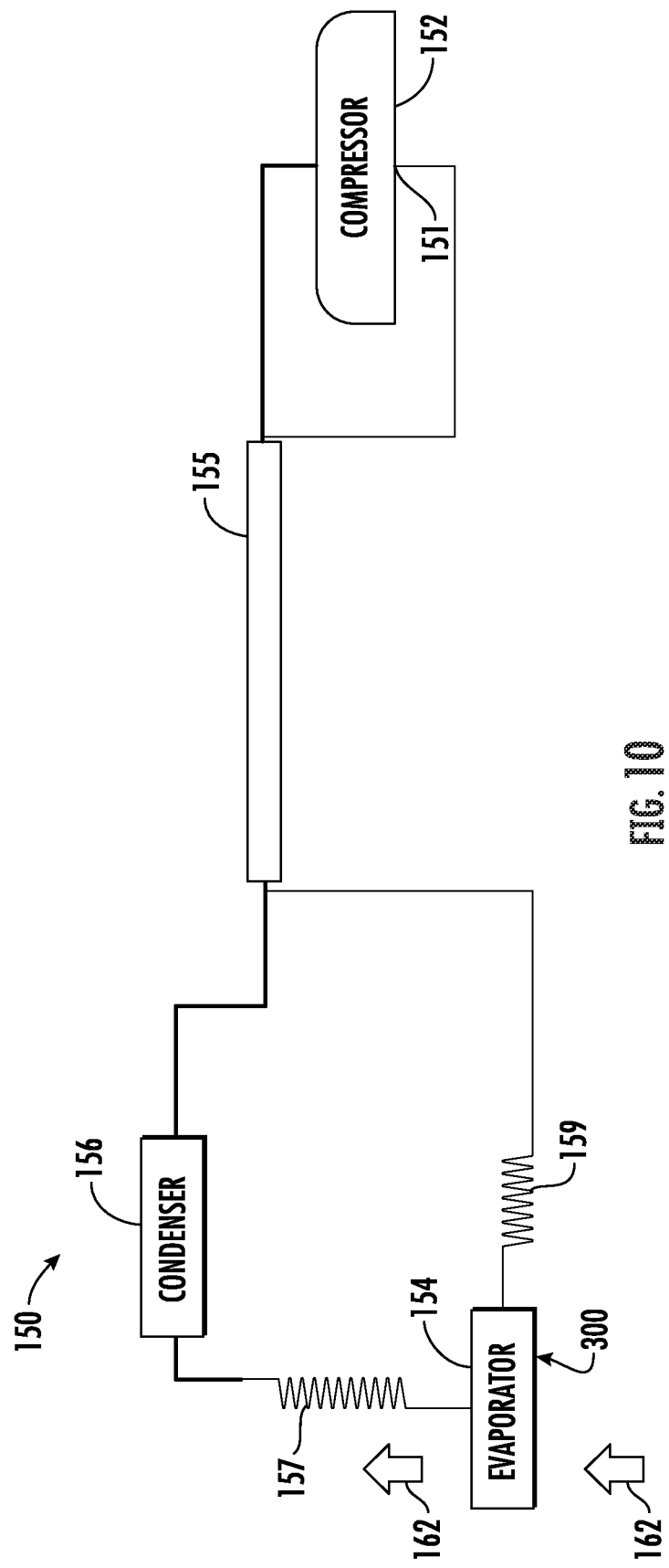
FIG. 10 provides a schematic view of an environmental control system for a gardening appliance according to one or more additional exemplary embodiments of the present subject matter.
Figure 11:
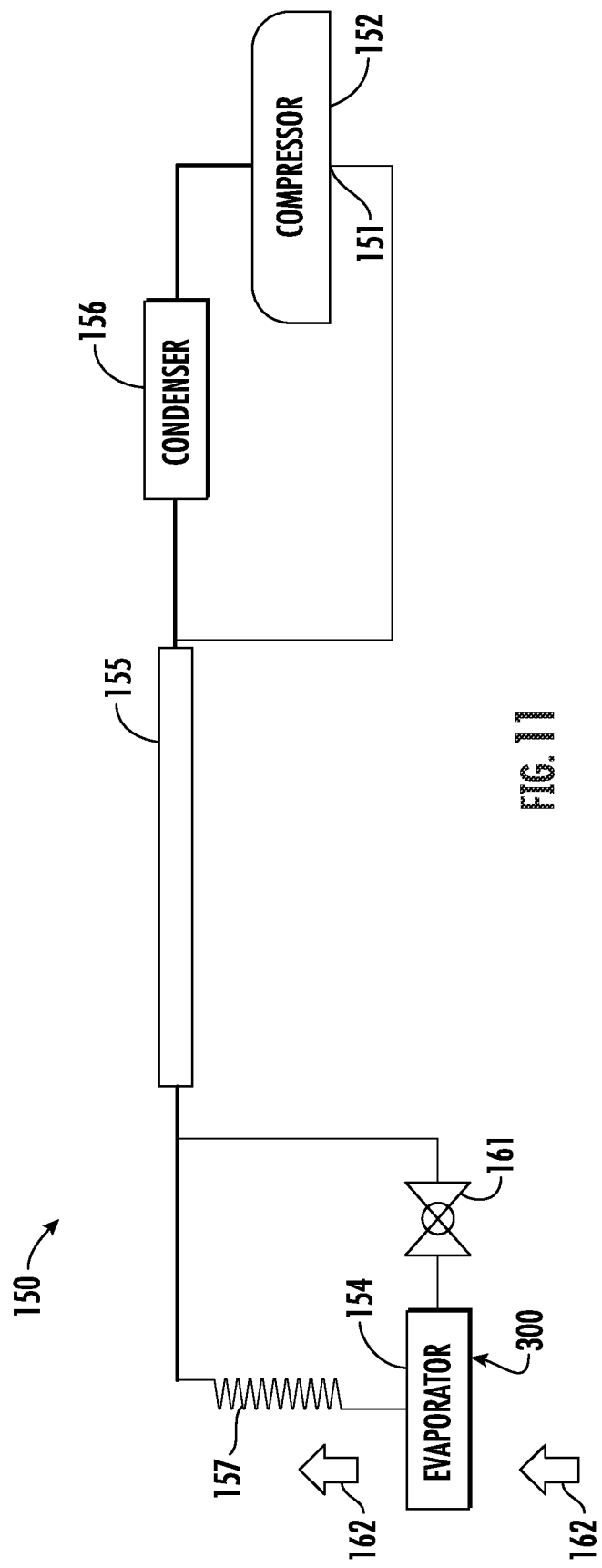
FIG. 11 provides a schematic view of an environmental control system for a gardening appliance according to one or more further exemplary embodiments of the present subject matter.
Figure 12:
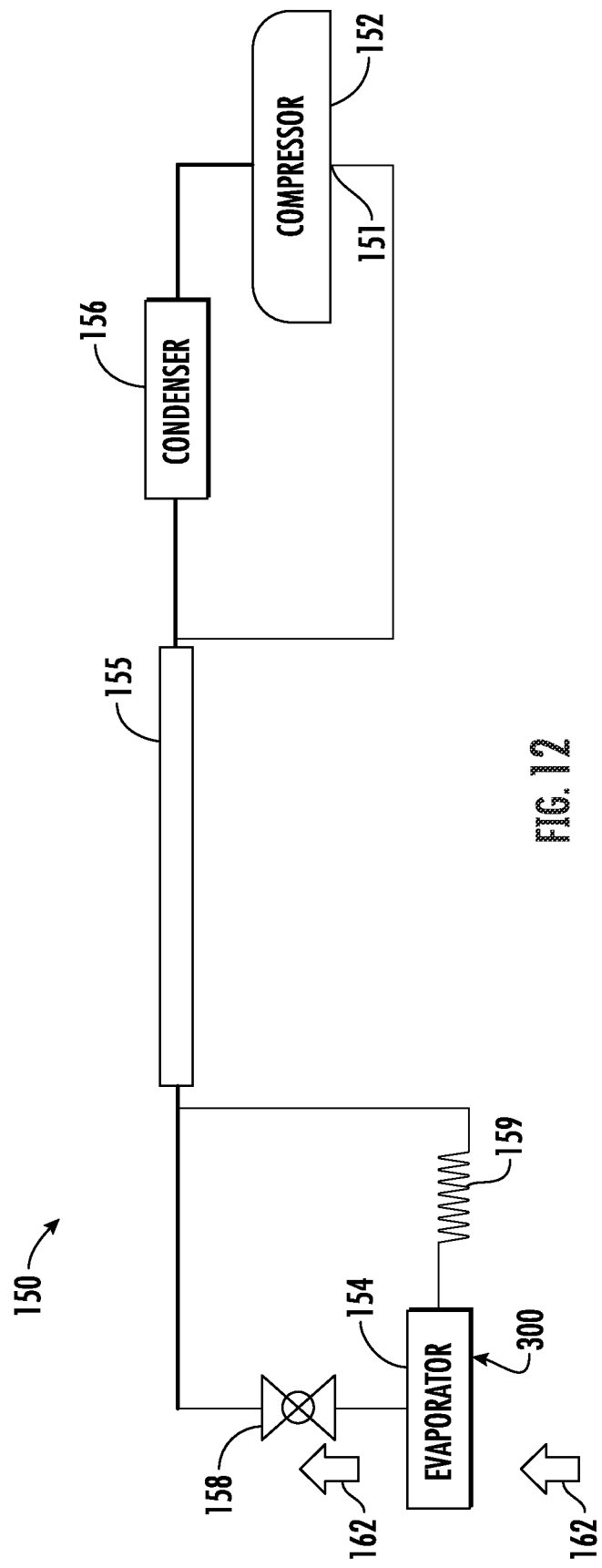
FIG. 12 provides a schematic view of an environmental control system for a gardening appliance according to one or more additional exemplary embodiments of the present subject matter.

In some embodiments, e.g., as illustrated in FIGS. 9 through 12, the heat exchange surface 300 is an exterior surface of the evaporator 154, where the sealed system 150 includes multiple expansion devices, such as a second expansion device between the evaporator 154 and the compressor 152, e.g., downstream of the evaporator 154 and upstream of the compressor 152 with respect to the refrigerant flow direction through the sealed system 150. For example, in some embodiments, e.g., as illustrated in FIGS. 9 and 10, both expansion devices may be capillary tubes 157 and 159. In such embodiments, the first capillary tube 157 is provided as an alternative to the expansion valve 158 described above. In additional embodiments, e.g., as illustrated in FIGS. 11 and 12, at least one of the expansion devices may be an expansion valve, such as an electronic expansion valve. In particular, the electronic expansion valve, e.g., valve 161 illustrated in FIG. 11, may advantageously adjust position to provide a desired (low) pressure to the compressor 152. In some embodiments, e.g., as illustrated in FIG. 11, the capillary tube 157 may be provided upstream of the evaporator 154, e.g., the capillary tube 157 is the first expansion device, and the expansion valve 161 may be the second expansion device between the evaporator 154 and the compressor 152. In additional embodiments, e.g., as illustrated in FIG. 12, the expansion valve 158 may be provided upstream of the evaporator 154 and the capillary tube 159 may be the second expansion device between the evaporator 154 and the compressor 152.

In some embodiments, e.g., as illustrated in FIGS. 9 through 12, the sealed system 150 may also include a heat recovery loop heat exchanger 155 between the evaporator 154 and the compressor 152. In particular, the heat recovery loop heat exchanger 155 may be positioned and configured within the sealed system 150 to provide heat to refrigerant in one side of the loop that is travelling to the evaporator 154 from refrigerant on the other side of the loop that is travelling to the compressor 152, such that the evaporator 154 receives warmer refrigerant while the compressor 152 receives cooler refrigerant, such as the suction side 151 of the compressor 152 as mentioned above. In some embodiments, e.g., as illustrated in FIGS. 9, 11, and 12, the heat recovery loop heat exchanger 155 may be located after the condenser 156, e.g., whereby refrigerant in the liquid phase passes through the heat recovery loop heat exchanger 155 on the way to the evaporator 154. In other embodiments, e.g., as illustrated in FIG. 10, the heat recovery loop heat exchanger 155 may be located before the condenser 156, e.g., such that refrigerant leaving the compressor 152 travels through the heat recovery loop heat exchanger 155 before reaching the condenser 156.

Figure 13:
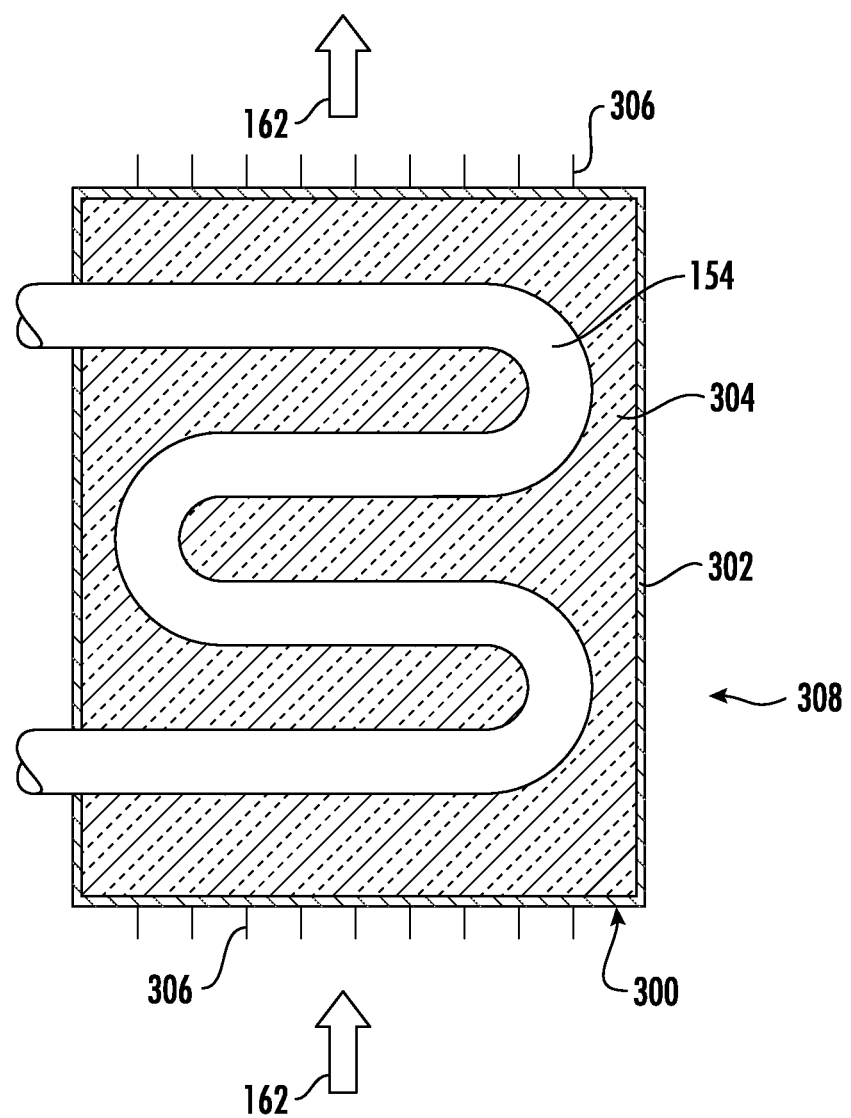
FIG. 13 provides a view of an insulated evaporator of an environmental control system for a gardening appliance according to one or more exemplary embodiments of the present subject matter.

In some embodiments, e.g., as illustrated in FIG. 13, the evaporator 154 may be enclosed within another heat exchanger, e.g., an auxiliary heat exchanger 308, wherein the heat exchange surface 300 that interacts with the air 162 flowing to the grow chamber 122 is an external surface of an outer shell 302 of the auxiliary heat exchanger 308. In such embodiments, the refrigerant from the sealed system 150 may flow through the evaporator 154 at a low pressure, such that the corresponding saturation temperature is low, e.g., below freezing, such as less than about 32° F., such as less than about 20° F., such as less than about 10° F., such as about 0° F., while the heat exchange surface 300 is at a higher temperature, e.g., above freezing. The auxiliary heat exchanger 308 may include the outer shell 302, with the evaporator 154 of the sealed system 150 fully enclosed on all sides within the outer shell 302 of the auxiliary heat exchanger 308. In some embodiments, a thermal insulation material 304 may be provided within the outer shell 302 and between the evaporator 154 and the outer shell 302. The thermal insulation material 304 may promote the temperature difference between the evaporator 154, e.g., the refrigerant therein, and the outer shell 302. In some embodiments, the auxiliary heat exchanger 308 may include fins 306 to provide additional surface area for interacting, e.g., exchanging heat, with the air 162 flow, as illustrated in FIG. 13. Similarly, the evaporator 154 may also include external fins which provide additional surface area and increased contact area between the evaporator 154 and the thermal insulation material 304. Such fins on the evaporator 154 are not specifically illustrated in FIG. 13. Those of ordinary skill in the art will recognize that such fins may be generally similar to the fins 306 which may be provided on the outer shell 302 of the auxiliary heat exchanger 308. Further, the structure and function of such fins will be understood by those of ordinary skill in the art, so the fins are not illustrated or described in further detail for the sake of brevity and clarity.

FIG. 14 illustrates a method 400 for operating a gardening appliance according to an exemplary embodiment of the present subject matter. Method 400 can be used to operate any suitable gardening appliance. For example, method 400 may be utilized to operate the exemplary gardening appliance 100 described above. Controller 174 of gardening appliance 100 may be programmed to implement method 400, e.g., controller 174 is capable of and may be operable to perform any methods and associated method steps as disclosed herein. In particular, method 400 may be usable with a gardening appliance that includes a cabinet defining a grow chamber within the cabinet, and an environmental control system configured to adjust atmospheric conditions in the grow chamber.

As illustrated in FIG. 14, the method 400 may include a step 410 of activating a compressor of the environmental control system to circulate a refrigerant through a sealed system of the environmental control system. The refrigerant circulates through the sealed system and performs a heat exchange cycle. For example, from the compressor, the refrigerant flows to the condenser where the refrigerant changes phase from gas to liquid, thereby releasing thermal energy, cooling the refrigerant and heating material, typically air, external to and in contact with the condenser. The liquid refrigerant then travels from the condenser to the evaporator, where the refrigerant absorbs thermal energy and changes back to a gas phase, thus heating the refrigerant and cooling the material, e.g., air, external to and in contact with the evaporator. From the evaporator, the refrigerant then returns to the compressor. In particular, the refrigerant enters the compressor at a suction side of the compressor. In at least some embodiments, the refrigerant entering the compressor has a pressure that corresponds to a saturation temperature below the freezing point of water.

Method 400 may further include a step 420 of flowing air across a heat exchange surface of the sealed system. For example, the heat exchange surface of the sealed system may be upstream of the grow chamber with respect to the air flow direction, such that the temperature and/or humidity of the air provided to the grow chamber may be altered or controlled by the heat exchange surface. The heat exchange surface may have a temperature greater than the temperature of the refrigerant in the evaporator and at the suction side of the compressor. For example, the heat exchange surface may have a temperature above the freezing point of water.

In some embodiments, the heat exchange surface across which the air flows upstream of the grow chamber during step 420 may be an exterior surface of an evaporator of the sealed system. In such embodiments, the sealed system may include an expansion device downstream of the evaporator and upstream of the compressor, such that the refrigerant flows through the evaporator at a first temperature above the freezing point of water and then the refrigerant flows to the expansion device from the evaporator and before reaching the compressor. In such embodiments, the expansion device causes pressure of the refrigerant to decrease (and thus the corresponding saturation temperature of the refrigerant also decreases) as the refrigerant flows through the expansion device after (downstream of) the evaporator. Thus, for example, the refrigerant may leave the expansion device at low pressure, e.g., pressure corresponding to the saturation temperature below the freezing point of water. In some embodiments, the expansion device may be a capillary tube. In additional embodiments, the expansion device may be an expansion valve, such as an electronic expansion valve. The electronic expansion valve may be electronically actuated and may thereby provide precise control of the amount of refrigerant and pressure of the refrigerant flowing to the evaporator.

In some embodiments, the step 410 of circulating the refrigerant through the sealed system may further include flowing the refrigerant through a heat recovery loop heat exchanger between an evaporator of the sealed system and the compressor. The heat recovery loop heat exchanger may cause the refrigerant flowing from the evaporator to the compressor to increase in temperature prior to entering the compressor. For example, the heat recovery loop heat exchanger may be fluidly coupled to the sealed system whereby refrigerant flowing in opposite directions through the heat recovery loop heat exchanger is alternately warmed or cooled, e.g., whereby refrigerant flowing to the evaporator loses heat to the refrigerant flowing from the evaporator to the compressor, thus increasing the temperature of the refrigerant flowing to the compressor and decreasing the temperature of the refrigerant flowing to the evaporator. In some embodiments, e.g., where the sealed system further includes a condenser between the compressor and the heat recovery loop heat exchanger, the heat recovery loop heat exchanger may be positioned between the condenser and the evaporator. In other embodiments, the heat recovery loop heat exchanger may be positioned between the condenser and the compressor.

In some embodiments, the heat exchange surface across which the air flows upstream of the grow chamber during step 420 may be an external surface of an outer shell of an auxiliary heat exchanger. For example, the sealed system may include an evaporator, and the step 410 of activating the compressor may urge the refrigerant through the evaporator at a temperature below the freezing point of water. In such embodiments, the evaporator may be enclosed in the auxiliary heat exchanger. The auxiliary heat exchanger may include a thermal insulation material between the evaporator and an outer shell of the auxiliary heat exchanger and, as mentioned, the heat exchange surface may be the external surface of the outer shell of the heat exchanger. Thus, the heat exchange surface may be at a distinct, e.g., warmer, temperature from the temperature of the refrigerator due at least in part to the thermal insulation material between the evaporator and the outer shell.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a gardening appliance, the gardening appliance comprising a cabinet defining a grow chamber within the cabinet, and an environmental control system configured to adjust atmospheric conditions in the grow chamber, the environmental control system comprising a sealed system, the sealed system comprising a compressor and an evaporator, the method comprising:

activating the compressor of the environmental control system to circulate a refrigerant through the sealed system of the environmental control system, wherein the refrigerant enters the compressor at a suction side of the compressor and the refrigerant entering the compressor has a pressure that corresponds to a saturation temperature below twenty degrees Fahrenheit, and wherein the compressor urges the refrigerant through the evaporator at a low pressure whereby the corresponding saturation temperature is below twenty degrees Fahrenheit; and flowing air across a heat exchange surface of the sealed system, wherein the heat exchange surface is an external surface of an outer shell of an auxiliary heat exchanger, the heat exchange surface of the sealed system upstream of the grow chamber with respect to the air flow direction, wherein the heat exchange surface has a temperature above the freezing point of water, wherein the evaporator is fully enclosed on all sides within the outer shell of the auxiliary heat exchanger, the auxiliary heat exchanger comprising a thermal insulation material between the evaporator and the outer shell of the auxiliary heat exchanger.

2. A gardening appliance, comprising:

a cabinet defining a grow chamber within the cabinet;

environmental control system configured to adjust atmospheric conditions in the grow chamber, the environmental control system comprising a sealed system, the sealed system comprising a compressor and an evaporator; and a controller, the controller configured for:

activating the compressor of the environmental control system to circulate a refrigerant through the sealed system of the environmental control system, wherein the refrigerant enters the compressor at a suction side of the compressor and the refrigerant entering the compressor has a pressure that corresponds to a saturation temperature below twenty degrees Fahrenheit, and wherein the compressor urges the refrigerant through the evaporator at a low pressure whereby the corresponding saturation temperature is below twenty degrees Fahrenheit; and flowing air across a heat exchange surface of the sealed system, wherein the heat exchange surface is an external surface of an outer shell of an auxiliary heat exchanger, the heat exchange surface of the sealed system upstream of the grow chamber with respect to the air flow direction, wherein the heat exchange surface has a temperature above the freezing point of water, wherein the evaporator is fully enclosed on all sides within the outer shell of the auxiliary heat exchanger, the auxiliary heat exchanger comprising a thermal insulation material between the evaporator and the outer shell of the auxiliary heat exchanger.

\* \* \* \* \*